United States Patent
Youn et al.

(10) Patent No.: US 7,402,121 B2
(45) Date of Patent: Jul. 22, 2008

(54) POWER TRANSMITTING SYSTEM FOR HYBRID VEHICLE

(75) Inventors: Joo Woong Youn, Seoul (KR); Yeon Ho Kim, Gyunggi-Do (KR)

(73) Assignee: Hyundai Motor Company, Seoul (KR)

( * ) Notice: Subject to any disclaimer, the term of this patent is extended or adjusted under 35 U.S.C. 154(b) by 235 days.

(21) Appl. No.: 11/303,809

(22) Filed: Dec. 15, 2005

(65) Prior Publication Data

US 2007/0129197 A1 Jun. 7, 2007

(30) Foreign Application Priority Data

Dec. 1, 2005 (KR) .................... 10-2005-0116648

(51) Int. Cl.
*F16H 57/08* (2006.01)
(52) U.S. Cl. ..................................... 475/331
(58) Field of Classification Search ........................ None
See application file for complete search history.

(56) References Cited

U.S. PATENT DOCUMENTS

| 4,359,914 | A | * | 11/1982 | Meisel, Jr. | .................. 475/346 |
| 5,006,098 | A | | 4/1991 | Yoshinaka et al. | |
| 6,155,364 | A | * | 12/2000 | Nagano et al. | .............. 180/65.2 |
| 6,585,066 | B1 | * | 7/2003 | Koneda et al. | .............. 180/65.2 |
| 6,966,866 | B2 | * | 11/2005 | Ando et al. | ...................... 477/4 |
| 7,081,060 | B2 | * | 7/2006 | Hata et al. | ...................... 475/5 |
| 7,101,297 | B2 | * | 9/2006 | Larson | .......................... 475/4 |
| 2002/0107101 | A1 | * | 8/2002 | Bowen et al. | ................... 475/5 |
| 2005/0054480 | A1 | * | 3/2005 | Ortmann et al. | ................. 477/6 |
| 2006/0287150 | A1 | * | 12/2006 | Kim et al. | ....................... 475/5 |

FOREIGN PATENT DOCUMENTS

JP 05-256349 10/1993

* cited by examiner

*Primary Examiner*—Sherry Estremsky
(74) *Attorney, Agent, or Firm*—Peter F. Corless; Edwards Angell Palmer & Dodge LLP

(57) ABSTRACT

A power transmitting system suitable for use with a hybrid vehicle is provided and preferably may comprise: (i) a first shaft and a second shaft; (ii) a planetary gear set; (iii) a power receiving apparatus that can receive power from the planetary gear set; (iv) a power transmitting member preferably in communication with the power receiving device and the second shaft to transmit power from the power receiving device to the second shaft. Because in preferred systems tension of a chain of a power transmitting system of a hybrid vehicle is not transmitted to a simple planetary gear set, damage to the simple planetary gear set may be prevented and the power transmitting system of the hybrid vehicle may be applied to many kinds of vehicles.

5 Claims, 4 Drawing Sheets

POWER TRANSMITTING SYSTEM FOR HYBRID VEHICLE

CROSS-REFERENCE TO RELATED APPLICATION

This application claims priority to and the benefit of Korean Patent Application No. 10-2005-0116648 filed in the Korean Intellectual Property Office on Dec. 1, 2005, the entire contents of which are incorporated herein by reference.

BACKGROUND OF THE INVENTION (a) Field of the Invention

The present invention relates to a power transmitting system of a hybrid vehicle. More particularly, in one preferred aspect, the present invention relates to a power transmitting system where a tension of a chain is not transmitted to a simple planetary gear set of the hybrid vehicle.

(b) Description of the Related Art

Generally, a power transmitting system of a hybrid vehicle transmits power generated in a motor or an engine of the hybrid vehicle.

FIG. 1 shows a power transmitting system of a hybrid vehicle according to the prior art and FIG. 2 shows a planetary gear and a sprocket of a power transmitting system of a hybrid vehicle according to the prior art.

According to the prior art, in the power transmitting system of a hybrid vehicle, power of a motor or an engine input to a planetary gear set 101 is transmitted to a sprocket 103.

A chain 109 is disposed to the sprocket 103.

That is, the chain 109 transmits the power from a first shaft 105 to a second shaft 107.

However, when power is being transmitted by the chain 109 from the first shaft 105 to the second shaft 107, in a case where the power of the motor increases, the tension of the chain 109 increases, and therefore a problem occurs that the planetary gear set 101 is damaged by the tension of the chain 109.

In addition, referring to FIG. 2, because the planetary gear set 101 and the sprocket 103 are separately disposed, a problem occurs that the power transmitting system occupies a large space.

In addition, when the power transmitting system is operated, a problem occurs that vibration and noise occur.

The information set forth in this Background of the Invention section is only for enhancement of understanding of the invention and should not be taken as an acknowledgement or any form of suggestion that this information forms the prior art that is already known to a person skilled in the art.

SUMMARY OF THE INVENTION

New power transmitting systems are now provided and in preferred aspects may prevent damage to a planetary gear set and reduce noise and/or vibration during operation of the power transmitting system operates.

In one aspect, a power transmitting system suitable for use with a hybrid vehicle is provided and suitably may comprise: (i) a first shaft and a second shaft; (ii) a planetary gear set; (iii) a power receiving apparatus that can receive power from the planetary gear set; (iv) a power transmitting member preferably in communication with the power receiving device and the second shaft to transmit power from the power receiving device to the second shaft.

An exemplary preferred power transmitting system of a hybrid vehicle according to an embodiment of the present invention includes a first shaft and a second shaft disposed in parallel, a simple planetary gear set disposed to the first shaft, a sprocket receiving power from the simple planetary gear set, a power transmitting member connected to both the sprocket and the second shaft to transmit the power from the sprocket to the second shaft, and a bearing supporting the sprocket such that the sprocket does not move in a direction of the simple planetary gear set.

The power transmitting member suitably may comprise a chain.

Another exemplary power transmitting system of a hybrid vehicle includes: a simple planetary gear set including a sun gear, a pinion gear, and a ring gear, and transmitting power input from the sun gear or the ring gear; a retainer transmitting the power to the simple planetary gear set; a first shaft connected to the planetary gear set; a sprocket connected to the ring gear of the planetary gear set, receiving the power from the planetary gear set, and transmitting the power to the second shaft; and a power transmitting member connected to both the sprocket and the second shaft to transmit the power from the sprocket to the second shaft, wherein slots are formed to an interior circumference of the retainer and protrusions of the ring gear are mounted to the slots such that the power is transmitted from the retainer to the simple planetary gear set.

The slots are preferably formed at intervals of about 60 degrees.

The power transmitting member suitably may comprise a chain.

The ring gear is suitably disposed between the pinion gear and the sprocket and spacers are suitably disposed between the ring gear and the retainer and between the ring gear and the sprocket.

The invention also includes vehicles that comprise a power transmitting system as described herein.

It is understood that the term "vehicle" or "vehicular" or other similar terms as used herein is inclusive of motor vehicles in general such as passenger automobiles including sports utility vehicles (SUV), buses, trucks, various commercial vehicles, and the like. The present transmitting systems will be particularly useful with a wide variety of hybrid motor vehicles including automobiles, trucks and the like.

Other aspects of the invention are discussed below.

DETAILED DESCRIPTION OF THE EMBODIMENTS

As discussed above, a power transmitting system suitable for use with a hybrid vehicle is provided and suitably may comprise: (i) a first shaft and a second shaft; (ii) a planetary gear set; (iii) a power receiving apparatus that can receive power from the planetary gear set; (iv) a power transmitting member preferably in communication with the power receiving device and the second shaft to transmit power from the power receiving device to the second shaft.

A variety of systems may be employed as the power receiving apparatus, such as e.g. a sprocket.

Exemplary embodiments of the present invention will hereinafter be described in detail with reference to the accompanying drawings.

Figure 1:
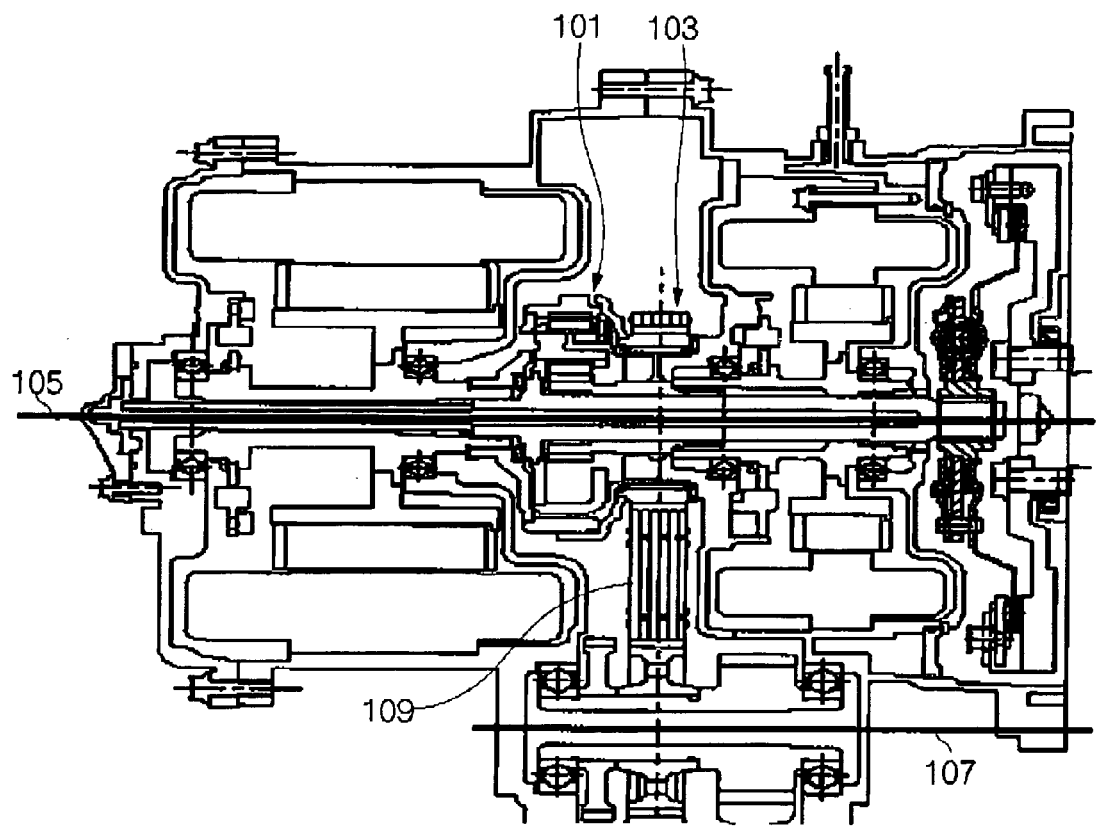
FIG. 1 shows a power transmitting system of a hybrid vehicle according to the prior art.
Figure 2:
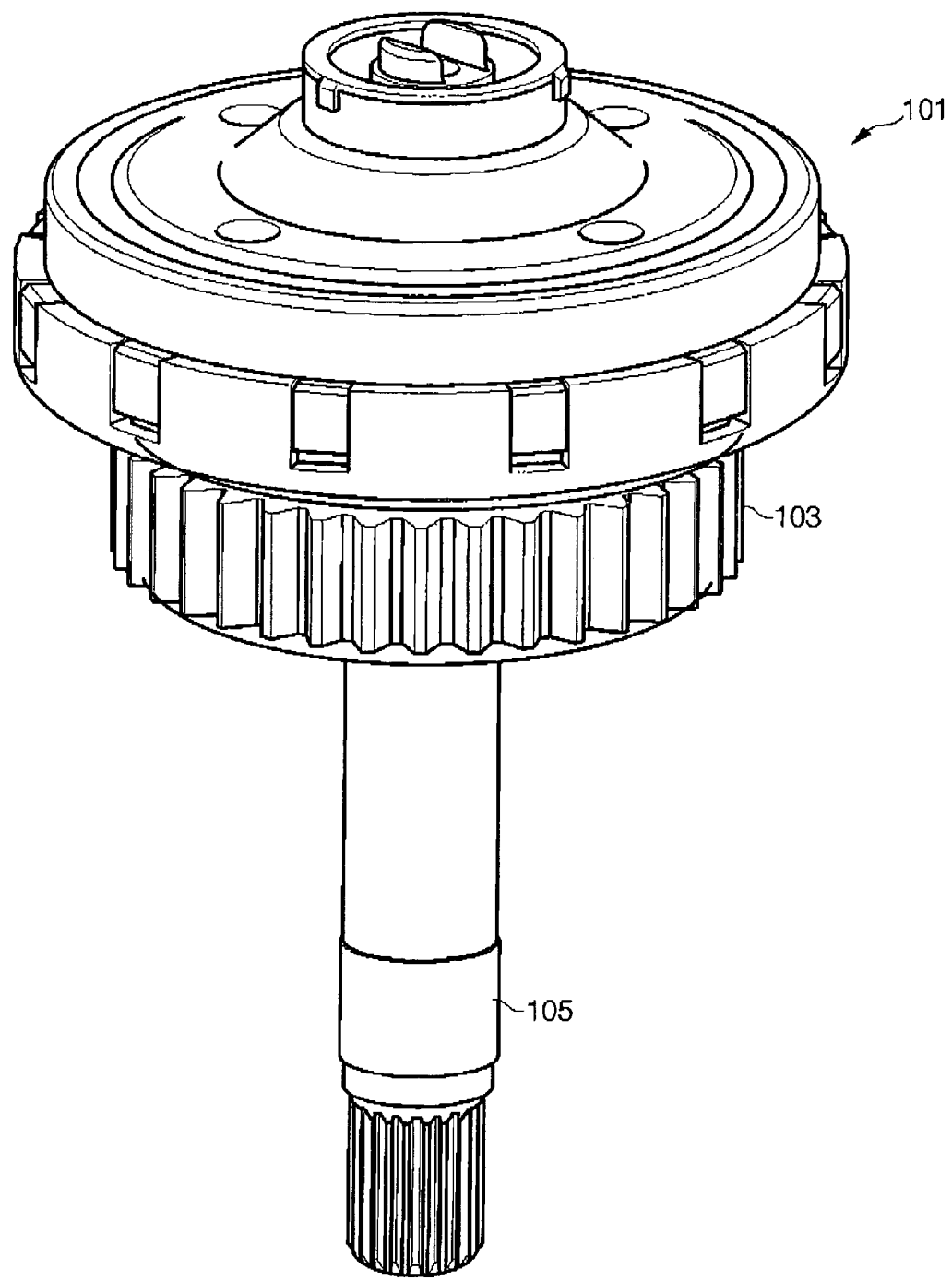
FIG. 2 shows a planetary gear and a sprocket of a power transmitting system of the hybrid vehicle according to the prior art.
Figure 3:
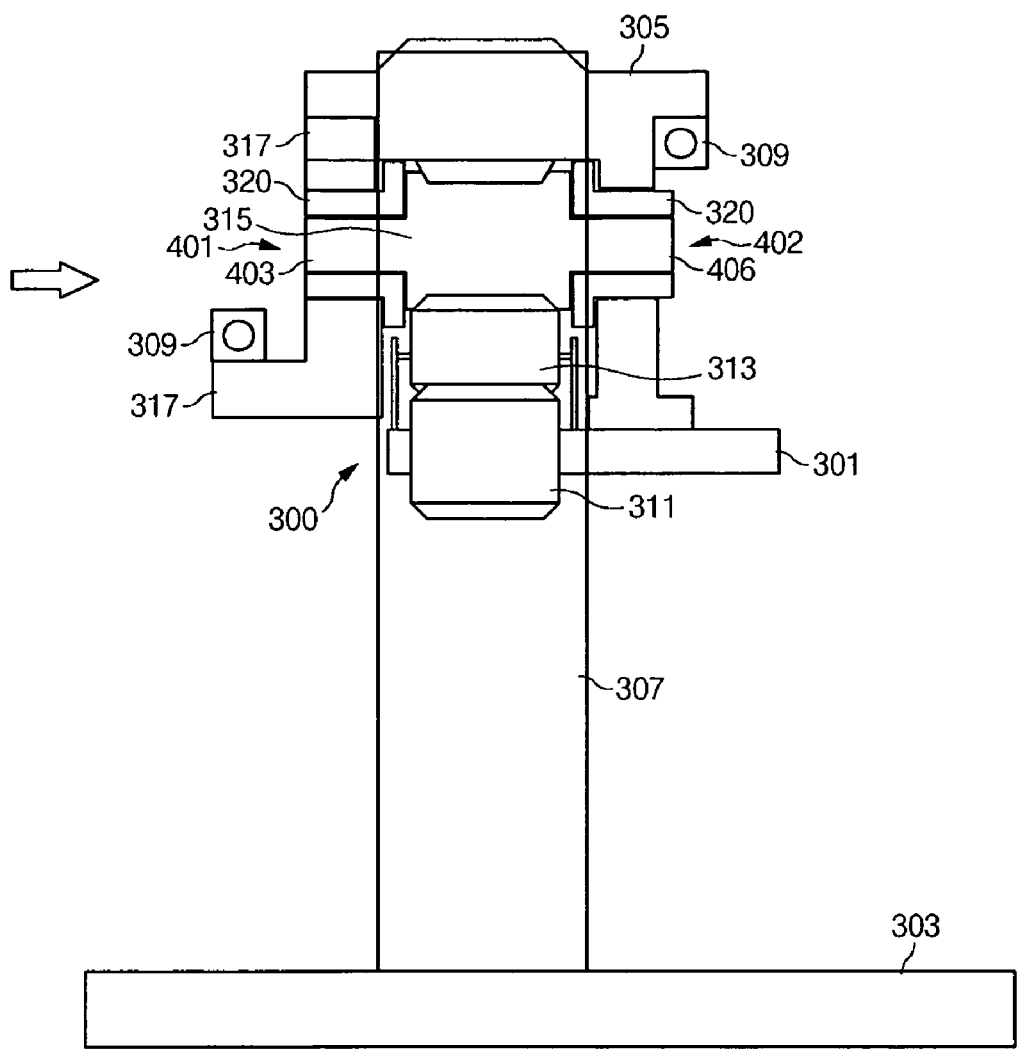
FIG. 3 shows a power transmitting system of a hybrid vehicle according to first and second exemplary embodiments of the present invention.

FIG. 3 shows a power transmitting system of a hybrid vehicle according to the first exemplary embodiment of the present invention.

As shown in FIG. 3, according to the first exemplary embodiment of the present invention, a power transmitting system of a hybrid vehicle suitably includes a first shaft 301, a second shaft 303, a simple planetary gear set 300, a sprocket 305, a power transmitting member 307, and a bearing 309.

The first shaft 301 and the second shaft 303 are preferably disposed in parallel and the simple planetary gear set 300 is suitably disposed to the first shaft 301.

The sprocket 305 receives power from the simple planetary gear set 300.

The power transmitting member 307 is preferably connected to both the sprocket 305 and the second shaft 303 to transmit the power from the sprocket 305 to the second shaft 303.

The bearing 309 suitably supports the sprocket 305 such that the sprocket 305 does not move in a direction of the simple planetary gear set 300.

According to the exemplary embodiment of the present invention, the power transmitting member 307 may be realized as or comprise a chain 307 and the bearing 309 may be secured to a case (not shown) of the power transmitting system.

Power generated in a motor (not shown) of the hybrid vehicle is suitably transmitted to the sprocket 305 through the simple planetary gear set 300.

In addition, the power transmitted to the sprocket 305 is suitably transmitted to the chain 307 and the chain 307 transmits the power from the first shaft 301 to the second shaft 303.

At that time, if a tension of the chain 307 increases by an increase in a torque generated in the motor, the simple planetary gear set 300 can be damaged.

However, as shown in FIG. 3, the bearing 309 is preferably disposed to a lower portion of the sprocket 305 such that the tension of the chain 307 is not transmitted to the simple planetary gear set 300.

Therefore, according to the power transmitting system of a vehicle of a preferred first exemplary embodiment of the present invention, although the power of the motor increases, damage to the simple planetary gear set 300 can be prevented.

In addition, as shown in FIG. 3, because the sprocket 305 and the simple planetary gear set 300 are disposed on the same plane, a volume of or the overall size of the power transmitting system may be reduced.

Furthermore, vibration and noise occurring in the power transmitting system may be reduced.

The simple planetary gear set 300 suitably includes a sun gear 311, a pinion gear 313, and a ring gear 315.

The ring gear 315 is suitably disposed between the pinion gear 313 and the sprocket 305 and spacers 320 are disposed between the ring gear 315 and the pinion gear 313 and between the ring gear 315 and the sprocket 305.

Figure 4:
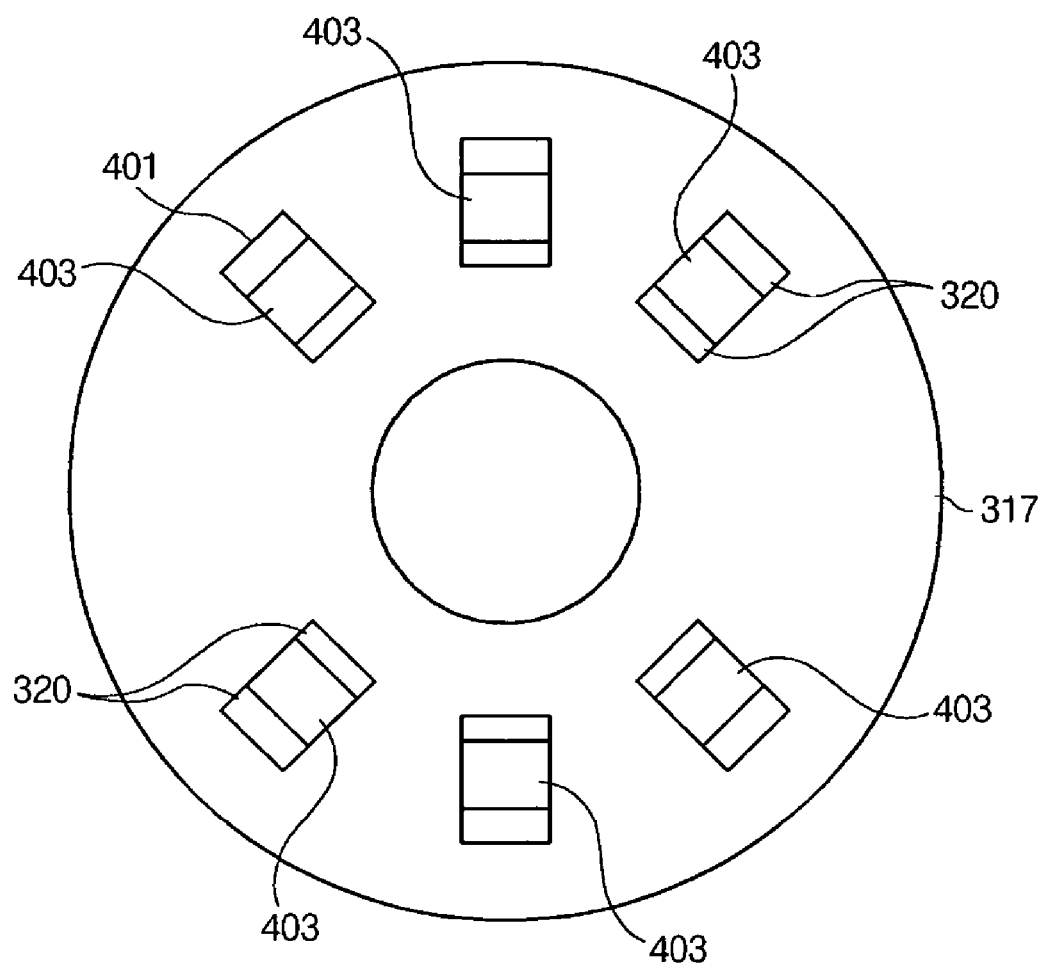
FIG. 4 shows a power transmitting system of a hybrid vehicle according to the second exemplary embodiment of the present invention.

FIG. 3 and FIG. 4 show a power transmitting system of a hybrid vehicle according to a second exemplary embodiment of the present invention.

More particularly, in FIG. 3, both of the first exemplary embodiment and the second exemplary embodiment of the present invention are shown, and FIG. 4 shows an arrow direction in FIG. 3 for the second exemplary embodiment.

The second exemplary embodiment of the present invention is in significant the same to the first exemplary embodiment of the present invention, but, as shown in FIG. 3 and FIG. 4, the second embodiment may preferably further include a retainer 317 transmitting the power transmitted from the motor to the simple planetary gear set 300.

In addition, according to the second exemplary embodiment of the present invention, slots 401 are preferably formed to an interior circumference of the retainer 317.

Protrusions 403 of the ring gear 315 are suitably mounted to the slots 401 such that power is transmitted from the retainer 317 to the simple planetary gear set 300.

More particularly, left protrusions 403 of the ring gear 315 in FIG. 3 are suitably connected to the slots 401 formed to the retainer 317.

In addition, right protrusions 406 of the ring gear 315 in FIG. 3 are suitably connected to the slots 402 formed to the sprocket 305.

The slots 401 and 402 are suitably formed at intervals preferably of about 60 degrees in the interior circumferences of the retainer 317 and the sprocket 305, respectively, the retainer 317 being shown in FIG. 4.

The retainer 317 transmits the power to the ring gear 315, that is to say, to the simple planetary gear set 300, through the slots 401.

In addition, as shown in FIG. 3, according to the second exemplary embodiment of the present invention, the ring gear 315 is suitably disposed between the pinion gear 313 and the sprocket 305.

Spacers 320 are suitably disposed between the ring gear 315 and the retainer 317 and between the ring gear 315 and the sprocket 305.

The spacers 320 are preferably made of a hard material such as a metal or metal alloy e.g. steel material having high durability.

As described above, because the tension of the chain 307 is not transmitted to the simple planetary gear set 300 by the spacers 320, damage to the simple planetary gear set 300 may be prevented or reduced.

In addition, according to the second exemplary embodiment of the present invention, the sprocket 305 and the simple planetary gear set 300 are disposed on the same or substantially the same plane, and so the volume of the power transmitting system may be reduced.

Furthermore, vibration and noise occurring in the power transmitting system may be reduced.

According to the exemplary preferred embodiments of the present invention, even though the power of the motor increases, damage to the simple planetary gear set can be prevented or reduced.

In addition, a volume of the power transmitting system is reduced and vibration and noise occurring in the power transmitting system may be reduced.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A power transmitting system of a hybrid vehicle, comprising:

a planetary gear set including a sun gear, a pinion gear, and a ring gear, and transmitting a power input from the sun gear or the ring gear;

a retainer transmitting the power to the planetary gear set;

a first shaft connected to the planetary gear set;

a sprocket connected to the ring gear of the planetary gear set, receiving the power from the planetary gear set, and transmitting the power to a second shaft; and a power transmitting member connected to both the sprocket and the second shaft to transmit the power from the sprocket to the second shaft, wherein slots are formed to an interior circumference of the retainer and protrusions of the ring gear are mounted to the slots such that the power is transmitted from the retainer to the planetary gear set.

2. The system of claim 1,
wherein the slots are formed at intervals of 60 degrees.

3. The system of claim 1,
wherein the power transmitting member comprises a chain.

4. The system of claim 1,
wherein the ring gear is disposed between the pinion gear and the sprocket, and
spacers are disposed between the ring gear and the retainer and between the ring gear and the sprocket.

5. A hybrid vehicle comprising a power transmitting system of claim 1.

* * * * *